United States Patent [19]

Lahtinen et al.

[11] Patent Number: 5,036,268
[45] Date of Patent: Jul. 30, 1991

[54] PROCEDURE AND APPARATUS FOR PRODUCING AN A.C. VOLTAGE

[75] Inventors: Matti Lahtinen, Espoo; Ismo Pyörre, Märynummi, both of Finland

[73] Assignee: Dynawatt Oy, Helsinki, Finland

[21] Appl. No.: 616,721

[22] PCT Filed: Nov. 18, 1987

[86] PCT No.: PCT/FI87/00156

§ 371 Date: Jun. 23, 1989

§ 102(e) Date: Jun. 23, 1989

[87] PCT Pub. No.: WO88/04113

PCT Pub. Date: Jun. 2, 1988

Related U.S. Application Data

[63] Continuation of Ser. No. 368,374, Jun. 23, 1989, abandoned.

[30] Foreign Application Priority Data

Nov. 26, 1986 [FI] Finland .................. 864826

[51] Int. Cl.$^5$ ............ H02P 9/48; H02J 7/14
[52] U.S. Cl. .................... 322/28; 363/37; 363/41; 363/98; 363/132
[58] Field of Search ........ 363/37, 98, 17, 41, 363/132; 322/28, 59, 89, DIG. 2

[56] References Cited

U.S. PATENT DOCUMENTS

| | | | | |
|---|---|---|---|---|
| 4,079,308 | 3/1978 | Hazumi | ............... | 322/61 |
| 4,339,697 | 7/1982 | Franz | ................ | 363/41 |
| 4,362,983 | 12/1982 | Mori | ................ | 322/28 |
| 4,399,499 | 8/1983 | Butcher et al. | .......... | 363/98 |
| 4,608,499 | 8/1986 | Rathmann | .......... | 363/17 |
| 4,661,761 | 4/1987 | Katsumata | .......... | 322/28 |
| 4,706,180 | 11/1987 | Wills | .......... | 363/98 |
| 4,751,629 | 6/1988 | Shimizu et al. | .......... | 363/37 |
| 4,757,438 | 7/1988 | Kawabata et al. | .......... | 363/41 |
| 4,839,576 | 6/1989 | Kaneyuki et al. | .......... | 322/28 |

FOREIGN PATENT DOCUMENTS

| | | |
|---|---|---|
| 016559 | 10/1980 | European Pat. Off. . |
| 0073045 | 3/1983 | European Pat. Off. ............ 363/41 |
| 100383 | 2/1984 | European Pat. Off. . |
| 163746 | 12/1985 | European Pat. Off. . |
| 211796 | 2/1987 | European Pat. Off. . |
| 1290822 | 3/1969 | Fed. Rep. of Germany . |
| 2402750 | 7/1975 | Fed. Rep. of Germany . |
| 131699 | 4/1975 | Norway . |
| 441733 | 11/1985 | Sweden . |
| 1345987 | 2/1974 | United Kingdom . |
| 1503948 | 3/1978 | United Kingdom . |
| 2091051 | 7/1982 | United Kingdom . |
| 2137381 | 10/1987 | United Kingdom . |

Primary Examiner—Peter S. Wong
Attorney, Agent, or Firm—Armstrong, Nikaido, Marmelstein, Kubovcik & Murray

[57] ABSTRACT

A procedure and an apparatus for producing an a.c. voltage, in which procedure the a.c. voltage ($u_o$) is produced via inversion from a d.c. voltage ($U_A$). The d.c. voltage ($U_A$) is produced by a generator (4). Moreover, the d.c. voltage ($U_A$) is measured and stabilized. The frequency of the a.c. voltage is determined by means of an oscillator (9).

10 Claims, 3 Drawing Sheets

PROCEDURE AND APPARATUS FOR PRODUCING AN A.C. VOLTAGE

This application is a continuation division of application Ser. No. 368,374 filed June 23, 1989, is now abandoned.

BACKGROUND OF THE INVENTION

The present invention concerns a procedure and apparatus for producing an a.c. voltage.

In particular in small combustion engine-driven generators producing a sinusoidal a.c. voltage, it is difficult to manage simultaneously both constant frequency and amplitude under changing load conditions because the frequency, and often also amplitude, are determined by speed of rotation exclusively. The speed is controlled using a centrifugal regulator or another mechanical governor, which in order to react requires a fairly large change in speed of rotation. Moreover, exact attainment of the correct frequency often requires separate measurement and continuous monitoring. Achieving a good sinusoidal waveform requires shaping the generator windings and air gaps in a way deviating from a design which is required to obtain maximum output power. As a result, the bulk of the generator increases and the weight increases in relation to the power output achieved.

SUMMARY OF THE INVENTION

The object of the present invention is to eliminate the drawbacks mentioned above. The procedure of the invention for producing an a.c. voltage is mainly characterized in that the a.c. voltage is formed via inversion from a d.c. voltage produced by means of a generator, that the d.c. voltage is measured and stabilized, and that the frequency of the a.c. voltage is generated with an oscillator. Since the frequency of the a.c. voltage is thus produced with a separate oscillator, a constant frequency independent of load and the speed of rotation of the generator is obtained. As the amplitude of the a.c. voltage is at the same time produced separately independent of frequency, stabilizing the amplitude becomes easier.

An advantageous embodiment of the procedure of the invention is characterized in that the d.c. voltage is stabilized by controlling the magnetization of the generator.

An advantageous embodiment of a procedure according to the invention is also characterized in that the oscillator uses a crystal for frequency stabilization.

An advantageous embodiment of the procedure of the invention is also characterized in that the a.c. voltage is filtered in conjunction with the a.c. conversion.

The apparatus implementing the procedure of the invention is characterized in that the apparatus comprises an inverter containing a control unit for producing the a.c. voltage via inversion from a d.c. voltage, a generator unit for producing a d.c. voltage by means of a generator, a d.c. voltage control unit for measuring and stabilizing the d.c. voltage obtained from the generator unit, and an oscillator unit in the control unit of the inverter for determining the frequency of the a.c. voltage.

An advantageous embodiment of the apparatus implementing the procedure of the invention is characterized in that the magnetization of the generator can be controlled by means of the magnetizing winding so as to stabilize the output voltage of the generator unit.

An advantageous embodiment of the apparatus implementing the procedure of the invention is also characterized in that the d.c. voltage control unit contains an operational amplifier for comparing the d.c. voltage produced in the generator unit to a reference voltage, transistors which together with the operational amplifier, amplify the difference between the d.c. voltage and the reference voltage, and a diode for excess voltage protection.

An advantageous embodiment of the apparatus implementing the procedure of the invention is also characterized in that the power stage of the inverter comprises semiconductor switches for producing an a.c. voltage from the d.c. voltage and a low-pass filter for filtering the a.c. voltage.

An advantageous embodiment of the apparatus implementing the procedure of the invention is also characterized in that the inverter power stage comprises an energy storage device connectable to the d.c. voltage circuit.

An advantageous embodiment of the apparatus implementing the procedure of the invention is also characterized in that the inverter control unit comprises a crystal and a microcircuit constituting the oscillator, a low-pass filter for producing a sinusoidal signal from the pulse-shaped signal produced in the oscillator, another low-pass filter for producing a triangular signal from another pulse-shaped signal obtained from the oscillator, a comparator for comparing the sinusoidal and triangular signals, and a transformer for supplying the signal from the comparator to the semiconductor switches of the inverter power stage.

BRIEF DESCRIPTION OF THE DRAWINGS

The invention is described in the following in detail with the aid of an example referring to the drawings attached, in which

FIG. 1 shows the apparatus which produces the a.c. voltage $u_o$ as provided by the invention by determining the amplitude, frequency and curve shape of the voltage by means of separate units. The a.c. voltage $u_o$ is formed in an inverter 3 by a.c. conversion of the d.c. voltage $U_A$. The d.c. voltage $U_A$ is produced in a generator unit 1 comprising an a.c. generator (G) 4 and a rectifier 5 composed of diodes, which rectifies the a.c. voltage produced by the generator 4. The generator 4 can be e.g. an automobile alternator.

The d.c. voltage $U_A$ obtained from the generator unit 1 is measured by the d.c. voltage control circuit 2 and stabilized by supplying the magnetizing winding $L_1$ of the generator 1 with a signal produced in the control circuit 2. The frequency of the a.c. voltage $u_o$ is formed with the aid of an oscillator in the control circuit 6 of the inverter.

Figure 1:
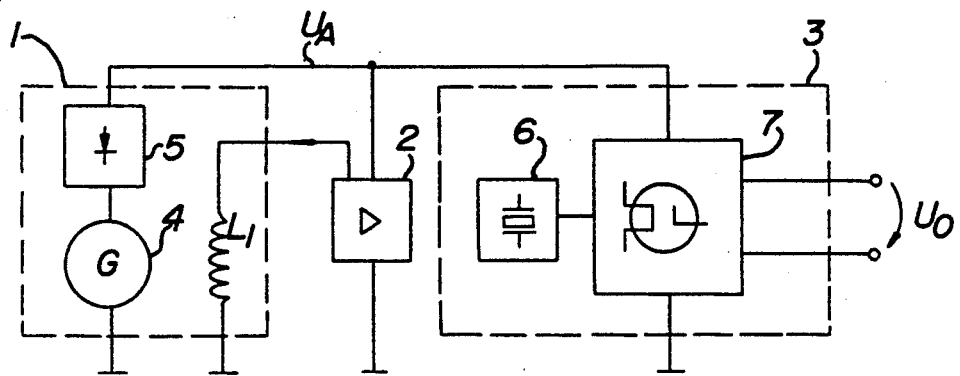
FIG. 1 shows the apparatus of the invention for producing an a.c. voltage.
Figure 2:
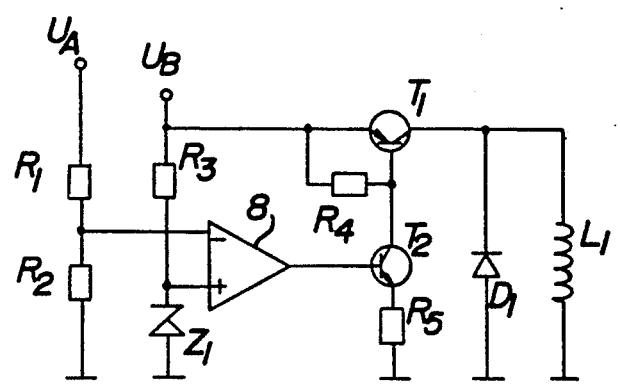
FIG. 2 shows the control unit and the magnetizing winding of the d.c. voltage.

FIG. 2 is a more detailed view of the d.c. voltage control unit 2 and the magnetizing winding $L_1$ presented in FIG. 1. The d.c. voltage $U_A$ produced by the generator unit 1 is applied to a voltage divider composed of resistors $R_1$ and $R_2$ in which the voltage $U_A$ is adapted to a level appropriate for input to the operational amplifier 8. The other input of the operational amplifier 8 is fed by a reference voltage formed from the voltage $U_B$ by means of the resistor $R_3$ and the Zener diode $Z_1$. The difference between the two input voltages of the operational amplifier 8 is amplified by the operational amplifier 8 and transistors $T_1$ and $T_2$.

The base electrode of transistor $T_1$ is controlled by connecting the voltage $U_B$ to resistor $R_4$, the base electrode of transistor $T_1$ connected over transistor $T_2$ and resistor $R_5$. The other terminal of resistor $R_4$ is connected to the base electrode of transistor $T_1$, and transistor $T_1$ is controlled by connecting the output of the operational amplifier 8 to its base electrode. The collector of transistor $T_1$ supplies the magnetizing winding $L_1$. Parallel to the magnetizing winding $L_1$ is connected a diode $D_1$, which inhibits access of overvoltage peaks to transistor $T_2$. The voltage $U_B$ has a magnitude of 12 V, obtained from a storage battery or the generator unit 1.

Figure 3:
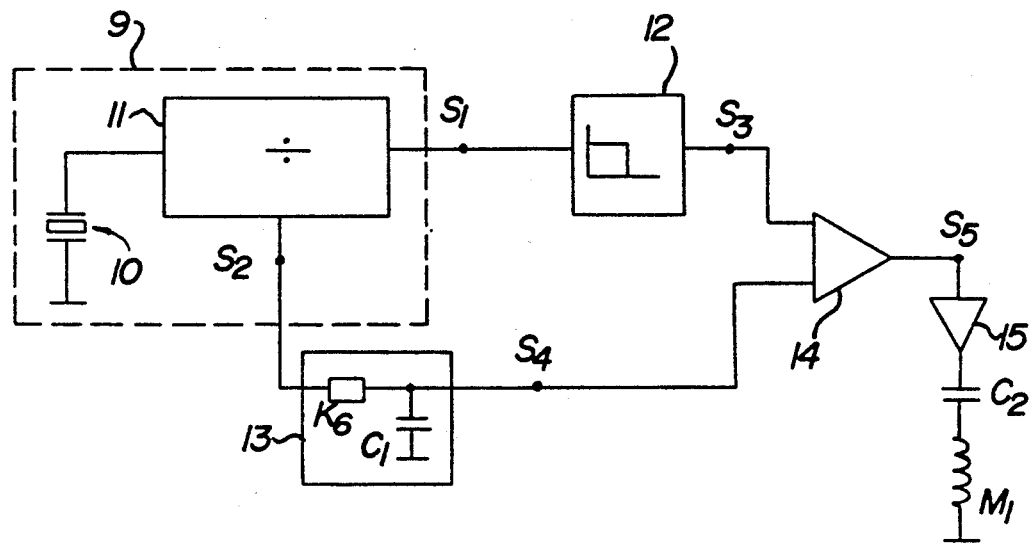
FIG. 3 shows the inverter control unit.
Figure 4A:
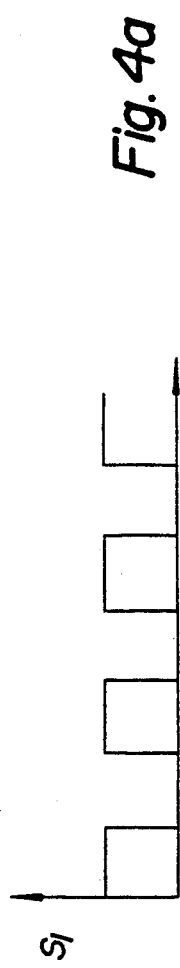
FIG. 4a illustrates a square-wave obtained from the oscillator of the control unit.
Figure 4B:
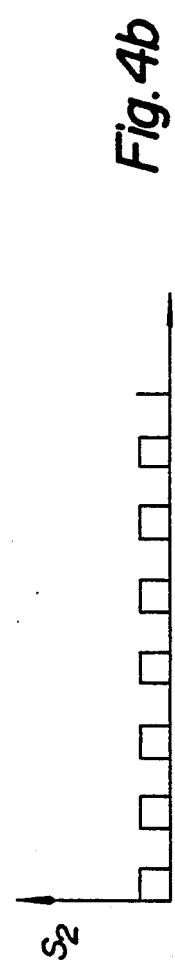
FIG. 4b illustrates the sinusoidal wave obtained from the low-pass filter of the inverter control unit.
Figure 4C:
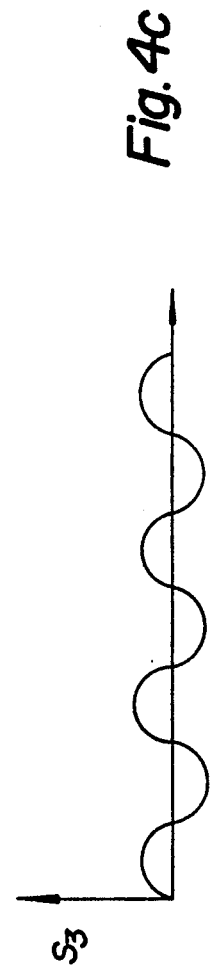
FIG. 4c illustrates the second square wave obtained from the oscillator of the inverter control unit.

FIG. 3 shows the control unit 6 of the inverter depicted in FIG. 1 in greater detail. The control unit is provided with an oscillator 9 for determining the frequency of the output a.c. voltage $u_o$. The oscillator consists of a crystal 10 with which the frequency is stabilized, and of a microcircuit 11 containing a phase inverter. If CMOS circuit CD4060 is used as the microcircuit 11, a suitable frequency of the crystal 10 is 819.2 kHz. When the signal obtained from the crystal 10 is divided in the microcircuit 11, a square wave signal $S_1$, shown in FIG. 4a, is obtained which has the frequency (50 Hz) required for the inverter output voltage $u_o$. By dividing the signal obtained from the crystal 10 by 32, another square wave $S_2$ is obtained, depicted in FIG. 4b, which has the frequency of 25.6 kHz. The signal $S_1$ is obtained by further dividing the second signal $S_2$ more by 512. The signal $S_1$ is fed into the low-pass filter 12 which passes the fundamental frequency 50 Hz but does not pass any higher harmonics, whereby a sinusoidal signal $S_3$ as shown in FIG. 4c is produced.

Figure 4D:
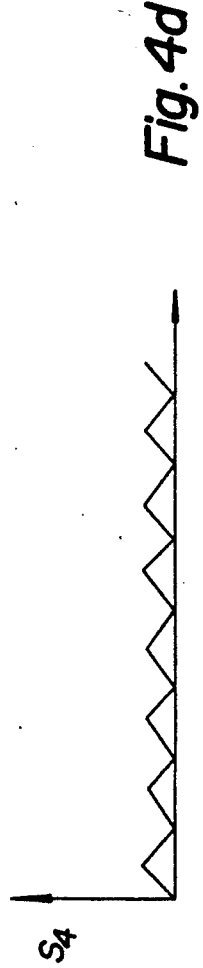
FIG. 4d illustrates the triangular wave obtained from the second low-pass filter of the inverter control unit.

The low-pass filter 12 can be implemented using an operational amplifier circuit, the design of which is obvious to a person skilled in the art and is therefore not dealt with in the present context. The other square wave $S_2$ is fed to another low-pass filter 13 composed of a resistor $R_6$ and a capacitor $C_1$, from the output of which is obtained the triangular wave $S_4$ shown in FIG. 4d. The sinusoidal signal $S_3$ and the triangular signal $S_4$ are compared in the comparator 14, which outputs the signal $S_5$ shown in FIG. 4e. This is a 25.6 kHz square signal modulated with a 50 Hz sinusoidal wave. This signal is applied via an amplifier 15 to a transformer $M_1$ which supplies the power stage 7 of the inverter. The capacitor $C_2$ separates the 50 Hz component present in the signal. The waves in FIGS. 4a–4e do not coincide in scale or in phase: they merely represent the signal form in each case.

Figure 5:
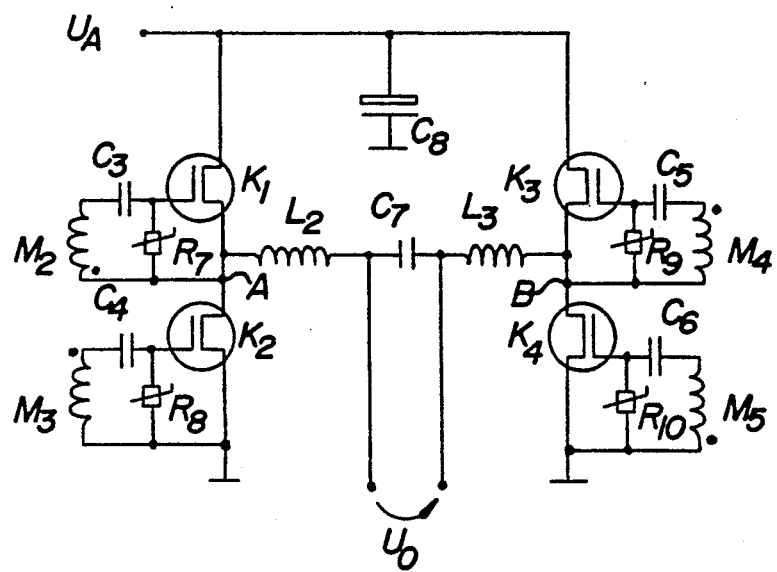
FIG. 5 illustrates the power stage of the inverter.

FIG. 5 shows the power stage 7 of the inverter depicted in FIG. 1, in which the voltage $U_A$ is the stabilized d.c. voltage formed in the generator unit 1, depicted in FIG. 1. The windings $M_2$–$M_5$ are secondary windings of the transformer $M_1$ presented in FIG. 3, while the capacitors $C_3$–$C_6$ are decoupling capacitors, each of which, together with the respective VDR resistors $R_7$–$R_{10}$, reconstructs the modulated signal $S_5$ formed in the comparator 14. Instead of VDR resistors, Zener diodes can also be used. The windings $M_2$–$M_5$ are so connected that windings $M_2$ and $M_5$ have the same polarity while windings $M_3$ and $M_4$ are reversed in polarity relative to that of $M_2$ and $M_5$. A reconstructed signal is used to drive each of the MOSFET semiconductor switches $K_1$–$K_4$.

Figure 4E:
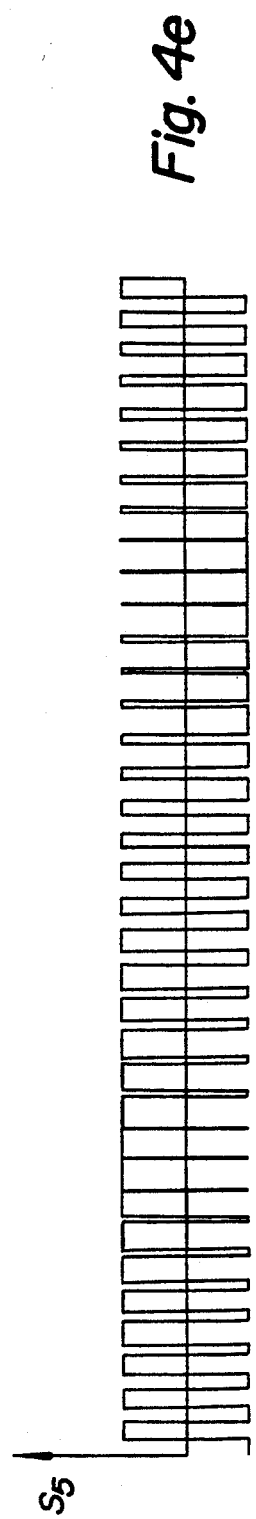
FIG. 4e illustrates a rectangular signal modulated with a sinusoidal wave.

At points A and B, a signal is produced which corresponds in form to the signal $S_5$ in FIG. 4e and in amplitude to the voltage $U_A$. The signals at the points A and B are opposite in phase. By passing said signals through a second order low-pass filter, consisting of an inductance $L_2$, a capacitor $C_7$ and another inductance $L_3$ connected in series, an output voltage $u_o$ is obtained across the terminals of the capacitor $C_7$. The voltage $u_o$ is sinusoidal, its frequency is stabilized with the crystal 6, and its amplitude corresponds to the d.c. voltage $U_A$. The capacitor $C_8$ is an electrolytic capacitor which enables a higher momentary output power to be achieved than could be obtained from the generator alone.

It is obvious to a person skilled in the art that the different embodiments of the invention are not restricted to the example described in the foregoing, and that they may vary within the scope of the claims stated below. A three-phase a.c. voltage may be formed by connecting three inverters in parallel. Instead of MOSFET semiconductor switches, other kinds of corresponding semiconductor switches may be used which have sufficient switching speed for a 25.6 kHz signal, and which are able to sustain the voltage $U_A$ and current drawn by the load connected to the output of the inverter 3. Besides a combustion engine, e.g. a hydraulic turbine, wave power or a windmill may be used to drive the generator 4 in FIG. 1. The capacitor $C_8$ of FIG. 5 may also be a storage battery or another equivalent energy storage, in which case a transient stopping of the generator 4 does not interrupt the operation of the entire apparatus. The 50 Hz frequency of the output voltage $u_o$ can also be changed e.g. into 60 Hz by replacing the crystal 10 in FIG. 3 with a 983.04 kHz crystal.

We claim:

1. Apparatus for producing an a.c. voltage, comprising:
   an a.c. generator for producing a first a.c. voltage, rectifier means for rectifying said a.c. voltage to produce as an output a d.c. voltage, inverter means for inverting said d.c. voltage to produce as an output a second a.c. voltage, said second a.c. voltage having a substantially constant frequency and a substantially constant maximum amplitude and being independent from a rotational velocity of said a.c. generator, control means for stabilizing said d.c. voltage to be substantially constant by measuring said d.c. voltage and regulating magnetization of said a.c. generator so that the amplitude of said second a.c. voltage is regulated, wherein said inverter means includes oscillator means for stabilizing the frequency of said second a.c. voltage so that it is formed separately from the amplitude of said second a.c. voltage.

2. Apparatus according to claim 1, wherein said inverter means includes a plurality of semiconductor switches which are fully gate controlled, and said oscillator means being connected for controlling said semiconductor switches, said means for controlling said semiconductor switches including said oscillator means, said oscillator means producing a first pulse-shaped signal and a second pulse-shaped signal which is different from said first pulse-shaped signal, said oscillator means including a crystal and a microcircuit, said inverter means further comprising (a) a low-pass filter for producing a sinusoidal signal from said first pulse-shaped signal generated by said oscillator means, (b) a second low-pass filter for forming a triangular signal from said second pulse-shaped signal generated by said oscillator means, (c) comparator means for comparing said sinusoidal signal and said triangular signal and for producing a comparator output signal, and a transformer means for supplying said comparator output signal to each of said plurality of semiconductor switches.

3. Apparatus according to claim 1, further comprising filter means connected to said plurality of semiconductor switches for filtering an output of said plurality of semiconductor switches to produce said second a.c. voltage.

4. A method of producing an a.c. voltage from a first a.c. voltage produced by an a.c. generator, comprising the steps of:
rectifying said first a.c. voltage with a rectifier to produce a d.c. voltage;
measuring said d.c. voltage and stabilizing said d.c. voltage by controlling magnetization of said a.c. generator based on the measured said d.c. voltage;
inverting said d.c. voltage to produce a second a.c. voltage with an inverter means having a plurality of semiconductor switches such that said second a.c. voltage has a substantially constant frequency and amplitude which are independent from a rotational velocity of said a.c. generator, said step of inverting comprising the steps of (a) providing an oscillator means producing an oscillator output signal and (b) using said oscillator output signal to convert said d.c. voltage into said second a.c. voltage such that said second a.c. voltage has a separately formed amplitude and frequency which are substantially constant.

5. A method according to claim 4, wherein said step of controlling magnetization of said a.c. generator comprises the steps of: (a) obtaining a reference voltage from one of an accumulator or said a.c. generator, (b) comparing said d.c. voltage to said reference voltage to form a difference signal, and (c) supplying said difference signal to a magnetizing winding of said a.c. generator.

6. A method according to claim 4, wherein in said step of inverting said d.c. voltage, further comprising the steps of: providing said semiconductor switches to be fully gate controllable, providing said oscillator to have a crystal and a microcircuit, using said oscillator to produce a first pulse-shaped signal and a second pulse-shaped signal, using said oscillator for controlling said plurality of semiconductor switches, and providing said inverter means to have a low-pass filter, using said low pass filter to produce a sinusoidal signal from said first pulse-shaped signal generated by said oscillator, a second low-pass filter for forming a triangular signal from said second pulse-shaped signal generated by said oscillator, a comparator for comparing said sinusoidal and triangular signals to produce a comparator output signal, and a transformer for supplying said comparator output signal to said semiconductor switches.

7. Electrical power system for producing sinusoidal a.c. voltage consisting of an a.c. generator provided with a magnetization winding for producing a first a.c. voltage, rectifier for rectifying said first a.c. voltage to a d.c. voltage, gate controlled semiconductor switches for inverting said d.c. voltage to a second a.c. output voltage, a first control unit for controlling said switches, said control unit comprising an oscillator provided with stabilizing means for determining the frequency of said output voltage independently from the rotational velocity of said generator, a second control unit for stabilizing the amplitude of said output a.c. voltage by measuring the d.c. voltage and regulating the magnetization of said generator in order to get an essentially constant d.c. voltage determining said amplitude, and filter means connected to said switches for forming an essentially sinusoidal output voltage.

8. Electrical power system according to claim 7, wherein said first control unit consists of a crystal or alike and a microcircuit, constituting an oscillator, a low-pass filter for producing a sinusoidal signal from a pulse-shaped signal generated by the oscillator, a second low-pass filter for forming a triangular signal from another pulse-shaped signal obtained from the oscillator, a comparator for comparing the sinusoidal and triangular signals, and a transformer for supplying the signal obtained from the comparator to the semiconductor switches.

9. Electrical power system according to claim 7, wherein the second control unit regulates the magnetization of said a.c. generator by comparing said d.c. voltage to a reference voltage, which is formed from an accumulator or said a.c. generator, and leading the difference of the comparison to the magnetizing winding of said a.c. generator.

10. Electrical power system according to claim 7, wherein said semiconductor switches are fully gate controlled, arranged in a H-bridge configuration and controlled with pulse width modulation.

* * * * *